United States Patent [19]
Ehret

[11] 4,286,203
[45] Aug. 25, 1981

[54] SLIP FREQUENCY CONTROL FOR VARIABLE SPEED INDUCTION MOTORS

[75] Inventor: Robert J. Ehret, Los Altos, Calif.

[73] Assignee: Beckman Instruments, Inc., Fullerton, Calif.

[21] Appl. No.: 20,389

[22] Filed: Mar. 14, 1979

[51] Int. Cl.³ .......................... H02P 5/34; H02P 7/42; H02P 5/28; H02P 5/36
[52] U.S. Cl. .................................. 318/801; 318/807; 318/800
[58] Field of Search ................ 318/314, 318, 798–802, 318/805, 807

[56] References Cited
U.S. PATENT DOCUMENTS

| | | | |
|---|---|---|---|
| 3,568,022 | 3/1971 | Domann et al. | 318/800 |
| 3,731,169 | 5/1973 | Burgholte et al. | 318/801 |
| 3,983,463 | 9/1976 | Nabae et al. | 318/803 |
| 4,042,862 | 8/1977 | Franklin | 318/800 |

Primary Examiner—J. V. Truhe
Assistant Examiner—John B. Conklin
Attorney, Agent, or Firm—R. J. Steinmeyer; F. L. Mehlhoff; Robert J. Stern

[57] ABSTRACT

A closed-loop drive system for variable speed induction motors for maintaining a constant slip frequency, regardless of motor speed. A slip frequency oscillator generates a signal having a frequency proportional to the desired slip of the motor and a tachometer generates a signal having a frequency proportional to the actual rotational speed of the motor. The stator frequency is the sum of the rotor speed and the slip frequency during acceleration and the difference between the rotor speed and the slip frequency during braking. Exclusive OR gates are used to add the slip frequency signal either to the tachometer signal or to the stator signal, the outputs of the gates being applied to a digital phase detector. The phase detector drives a voltage controlled oscillator which provides the stator signal. The output of the voltage controlled oscillator is used to trigger the slip frequency oscillator to prevent overlap of pulses to the digital phase detector.

8 Claims, 1 Drawing Figure

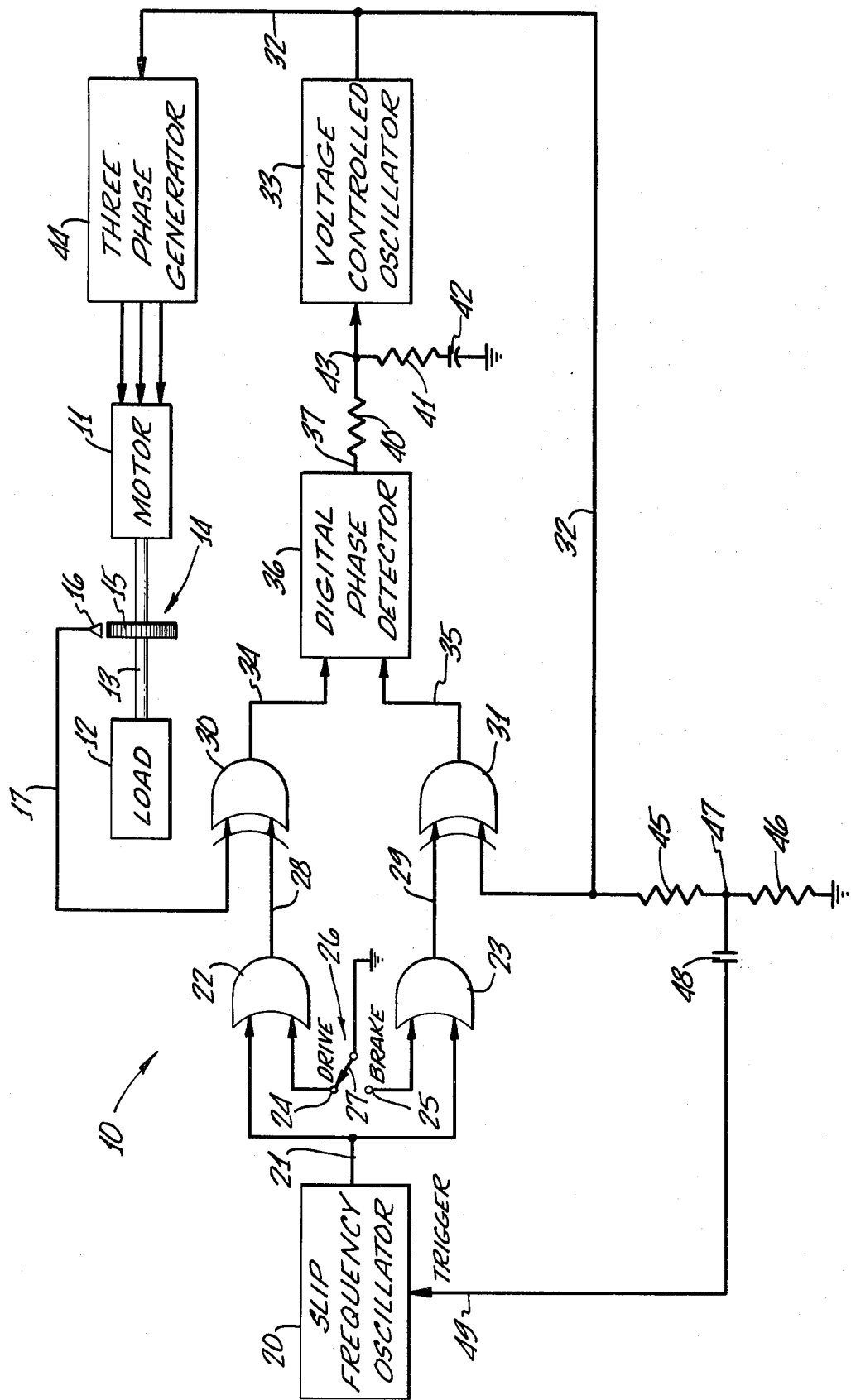

SLIP FREQUENCY CONTROL FOR VARIABLE SPEED INDUCTION MOTORS

BACKGROUND OF THE INVENTION

1. Field of the Invention

The present invention relates to a slip frequency control for variable speed induction motors and, more particularly, to a closed-loop drive system for variable speed induction motors which maintains a constant slip frequency during both acceleration and braking, regardless of motor speed.

2. Description of the Prior Art

In an induction motor, the input energy is connected to the stator or the rotor circuit, typically to the field or stator winding. This eliminates the necessity for brushes which is a significant disadvantage in DC motor. In any event, the input energy causes a current to flow in the stator winding which creates a rotating magnetic field. The frequency of the input energy defines the synchronous speed of the motor.

An induction motor is capable of producing driving torque at any speed below the synchronous speed. If the rotor speed is greater than the stator frequency, braking torque is produced. In either event, the slip frequency is defined as the difference between the stator frequency and the actual rotational speed of the motor.

For a variety of reasons, it is desirable to maintain a constant slip frequency, regardless of motor speed. If, under given operating conditions, the slip frequency increases, the result is an increased motor current at the expense of higher output power. This increased current could become excessive and cause an overload shutdown of the power source.

Various schemes have been proposed to control the slip frequency in order to limit motor torque and current. Open loop frequency control methods are unsatisfactory where variable inertia loads are encountered or if unexpected friction loading occurs. Thus, phase-locked loop systems are preferred and such are known for induction motor control. Such systems generally employ a voltage controlled oscillator driven by a tachometer signal derived from the rotation of the motor shaft and the output of a slip frequency oscillator. Systems of this type are disclosed in U.S. Pat. Nos. 3,731,169 and 4,042,862. However, prior closed-loop drive systems have either had limited capabilities or have been overly complex and therefore impractical.

SUMMARY OF THE INVENTION

According to the present invention, these problems are solved by providing a novel digital closed-loop system for variable speed induction motors. The present drive system is of the general type which derives a signal from a tachometer proportional to the actual rotor speed, a signal from a slip frequency oscillator proportional to the desired slip frequency, and a signal from a voltage controlled oscillator for providing a stator drive signal for the motor. The stator frequency is the sum of the rotor frequency and the slip frequency during acceleration and driving of the motor and the difference between the rotor frequency and the slip frequency during braking of the motor. However, novel and simplified circuitry is employed for controlling the voltage controlled oscillator and for triggering the slip frequency oscillator to prevent overlap of output pulses from the VCO and the slip frequency oscillator.

Briefly, and in accordance with the present invention, a closed-loop drive system for variable speed induction motors comprises tachometer means for providing a first pulse train having a frequency proportional to the actual rotational speed of the motor, a slip frequency oscillator for providing a second pulse train having a frequency proportional to the desired slip of the motor, a first exclusive OR gate responsive to the first pulse train and selectively responsive to the second pulse train for providing a third pulse train having a frequency proportional to the sum of the first and second pulse trains during driving of the motor and proportional to the first pulse train only during braking of the motor, a voltage controlled oscillator for providing a fourth pulse train for application to the motor to control the speed thereof, a second exclusive OR gate responsive to the fourth pulse train and selectively responsive to the second pulse train for providing a fifth pulse train having a frequency proportional to the sum of the second and fourth pulse trains during braking of the motor and proportional to the fourth pulse train only during driving of the motor, feedback means responsive to the fourth pulse train for triggering the slip frequency oscillator to prevent overlap of pulses of the second and fourth pulse trains, a digital phase detector responsive to the third and fifth pulse trains for providing an output signal proportional to the phase difference therebetween, and filter means for conducting the output signal to the voltage controlled oscillator for controlling the frequency thereof.

OBJECTS, FEATURES, AND ADVANTAGES

It is therefore an object of the present invention to solve the problems encountered heretofore in closed-loop drive systems for variable speed induction motors. It is a feature of the present invention to solve these problems by providing a highly simplified circuit for driving a motor in such a manner as to maintain a constant slip frequency, regardless of motor speed. The advantage of the present system is that closed-loop drive systems for variable speed induction motors are now practical.

It is a further object of the present invention to solve the problem associated with overlapping of pulses of pulse trains which are added. It is a feature of the present invention to solve this problem by triggering the output of a slip frequency oscillator from the output of a voltage controlled oscillator. The advantage to be derived is that overlap of pulses from these oscillators is prevented.

It is a still further object of the present invention to solve the problem of maintaining a constant slip frequency in a variable frequency AC drive system, regardless of motor speed. It is a feature of the present invention to solve this problem by providing a closed-loop drive system for variable speed induction motors in which the stator frequency is the sum of the rotor frequency and the slip frequency during acceleration and the difference between the rotor frequency and the slip frequency during braking. An advantage to be derived is a highly simplified and efficient drive system which makes the use of induction motors practical and provides optimum motor performance.

Still other objects, features, and attendant advantages of the present invention will become apparent to those skilled in the art from a reading of the following detailed description of the preferred embodiment constructed in accordance therewith, taken in conjunction with the accompanying drawing wherein:

BRIEF DESCRIPTION OF THE DRAWING

The sole FIGURE is a diagram, partially in block form, of a closed-loop drive system for variable speed induction motors constructed in accordance with the teachings of the present invention.

DESCRIPTION OF THE PREFERRED EMBODIMENT

Referring now to the drawing, there is shown a closed-loop drive system, generally designated 10, for driving an induction motor 11. Induction motor 11 is operative to drive a load 12 through a suitable coupling, such as a shaft 13. Tachometer means 14 are provided for producing output pulses indicative of the rotational speed of shaft 13. Means 14 may include a notched tachometer disc 15 mounted on shaft 13 and a photosensor or other means 16 for producing a pulse train on a line 17 having a frequency proportional to the actual rotational frequency of motor 11. A suitable tachometer pickup is described in my prior U.S. Pat. No. 3,436,637.

Drive system 10 includes a slip frequency oscillator 20 for providing a pulse train having a frequency proportional to the desired slip of motor 11. Slip frequency oscillator 20 may be any conventional type of oscillator, such as a relaxation oscillator, the output of which appears on a line 21. The output of slip frequency oscillator 20 on line 21 is applied to the first inputs of first and second NOR gates 22 and 23. The second inputs of NOR gates 22 and 23 are connected to terminals 24 and 25, respectively, of a switch 26. Switch 26 has a movable arm 27 adapted to be connected to circuit ground. The effect is that only that NOR gate having its second input connected via arm 27 to ground is operative to pass pulses from slip frequency oscillator 20. Thus, during acceleration or driving of motor 11, arm 27 of switch 26 is in contact with terminal 24 and the pulses on line 21 from slip frequency oscillator 20 will appear on line 28, at the output of NOR gate 22. During braking of motor 11, arm 27 of switch 26 is in contact with terminal 25 and the pulses on line 21 from slip frequency oscillator 20 will appear on line 29, at the output of NOR gate 23.

The outputs of gates 22 and 23 on lines 28 and 29, respectively, are connected to the first inputs of exclusive OR gates 30 and 31, respectively. The output of tachometer means 14 on line 17 is applied to the second input of OR gate 30. The second input of OR gate 31 is connected to a line 32 which is connected to the output of a voltage controlled oscillator 33 to be described more fully hereinafter.

The outputs of OR gates 30 and 31 on lines 34 and 35, respectively, are connected to the inputs of a frequency comparator, preferably a digital phase detector 36. Detector 36 preferably functions to provide a pulse output on a line 37, the duty cycle and polarity of which is a function of the phase difference between the inputs on lines 34 and 35. Preferably, the output of phase detector 37 is positive if the phase of the signal on line 34 leads the phase of the signal on line 35 and is negative if the phase of the signal on line 34 lags the phase of the signal on line 35. Phase detector 36 may be a type CD 4046 integrated circuit manufactured by RCA Corporation.

The output of phase detector 36 on line 37 is conducted to the series combination of a resistor 40, a resistor 41, and a capacitor 42, capacitor 42 also being connected to ground. Thus, the output of phase detector 37 either charges or discharges capacitor 42, depending upon the polarity of the output thereof. The charge on capacitor 42, at the junction 43 between resistors 40 and 41, is applied to the input of voltage controlled oscillator 33 for controlling the frequency thereof.

Voltage controlled oscillator 33 is a conventional VCO having a pulse output on line 32, the frequency of which is proportional to the voltage at junction 43. This output is applied to OR gate 31, as described previously. This output also provides the stator signal for driving motor 11. For this purpose, the output of oscillator 33 on line 32 is applied to a three-phase generator 44, the outputs of which are applied to the stator of motor 11 in a conventional manner.

The output pulses of VCO 33, slip frequency oscillator 20 and tachometer means 14 may overlap. Since all of these pulses are applied to digital phase detector 36, the overlap of the pulses could result in an erroneous output from phase detector 36. To prevent this from happening, the output of VCO 33 on line 32 is applied to a voltage divider network consisting of resistors 45 and 46 connected between line 32 and ground. The junction 47 between resistors 45 and 46 is connected via a capacitor 48 to the trigger input 49 of slip frequency oscillator 20. Thus, the pulses on line 32 trigger oscillator 20, but due to circuit delays, the pulses on line 21 from oscillator 20 will always lag the pulses on line 32 from oscillator 33 by a fraction of a microsecond, thus avoiding exact coincidence of the pulses in the two pulse trains.

In operation, tachometer means 14 provides a first pulse train having a frequency proportional to the actual rotational speed of motor 11. Slip frequency oscillator 20 provides a second pulse train having a frequency proportional to the desired slip of motor 11. During acceleration of driving of motor 11, the output of slip frequency oscillator 20 on line 21 is passed by NOR gate 22 to exclusive OR gate 30 where the first and second pulse trains are combined providing a third pulse train having a frequency proportional to the sum of the first and second pulse trains. During this time, NOR gate 23 is inhibited and the output of exclusive OR gate 31 is a pulse train having a frequency proportional to the pulse train output of voltage controlled oscillator 33 only.

On the other hand, during braking of motor 11, NOR gate 22 is inhibited so that the output of gate 30 on line 34 is a pulse train having a frequency proportional to the pulse train on line 17 only. At this time, the output of gate 31 on line 35 is a pulse train having a frequency proportional to the sum of the pulse trains from oscillator 20 and oscillator 33.

During driving or acceleration of motor 11, the function of phase detector 36 is to ensure that the stator drive frequency, i.e. the frequency output of oscillator 33, is equal to the sum of the actual rotor frequency and the slip frequency. If there is equality, the output of detector 36 on line 37 is zero and the existing charge on capacitor 42 is used to control the output frequency of oscillator 33, which output is applied to generator 44 to drive motor 11. If motor 11 now speeds up or slows down so that the sum of the actual rotor frequency and the slip frequency is greater or less than the frequency from oscillator 33, an output appears on line 37 from detector 36 to increase or decrease the charge on capacitor 42, to increase or decrease the voltage applied to oscillator 33. This changes the frequency of VCO 33 until a condition of equality is reached. Thus, during acceleration or driving of motor 11, drive system 10 operates as a closed-loop system for driving motor 11 to maintain a constant slip frequency, regardless of the speed of motor 11.

During braking of motor 11, the frequency of the signal applied to motor 11 should be lower than the actual rotor frequency, the difference again being the desired slip frequency. Therefore, during braking of motor 11, the output of oscillator 20 is added to the output of oscillator 33 in gate 31 and this output is compared to the output of gate 30 on line 34 which is now proportional only to the actual rotor frequency. Thus, during braking, the stator frequency plus the slip frequency is equal to the actual rotor frequency or the stator frequency is equal to the rotor frequency minus the slip frequency. In any event, digital phase detector 36 operates in the same manner as described previously to ensure that the output of oscillator 33 drives motor 11 to maintain the slip frequency constant regardless of the motor speed.

As described previously, the feedback loop from oscillator 33 to oscillator 20, including resistors 45 and 46 and capacitor 48, prevents overlap of the pulses at the input to detector 36. That is, the output of oscillator 33 is used to trigger oscillator 20 so that whenever there is pulse at the output of oscillator 33, this is sensed by oscillator 20 which then generates its next pulse. Due to circuit delays within oscillator 20, this cannot occur instantaneously so that the output of oscillator 20 will always lag the output of oscillator 33 by a fraction of a microsecond and this is sufficient to avoid exact coincidence of the two pulses.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A closed-loop drive system for variable speed induction motors comprising:
    means for providing a first pulse train having a frequency proportional to the actual rotational speed of said motor;
    means for providing a second pulse train having a frequency proportional to the desired slip of said motor;
    a first exclusive OR gate responsive to said first pulse train and selectively responsive to said second pulse train for providing a third pulse train having a frequency proportional to the sum of the frequencies of said first and second pulse trains during driving of said motor and proportional to the frequency of said first pulse train only during braking of said motor;
    means for providing a fourth pulse train;
    means for supplying to said motor a drive signal having a frequency proportional to the frequency of said fourth pulse train;
    a second exclusive OR gate responsive to said fourth pulse train and selectively responsive to said second pulse train for providing a fifth pulse train having a frequency proportional to the sum of the frequencies of said second and fourth pulse trains during braking of said motor and proportional to the frequency of said fourth pulse train only during driving of said motor;
    means responsive to said fourth pulse train for triggering said second pulse train providing means to prevent pulses of said second and fourth pulse trains from having exactly coincident transitions;
    means responsive to said third and fifth pulse trains for providing an output signal proportional to the frequency or phase difference therebetween; and
    means for conducting said output signal to said fourth pulse train providing means for controlling the frequency thereof.

2. A closed-loop drive system according to claim 1, wherein said fourth pulse train providing means comprises:
    a voltage controlled oscillator.

3. A closed-loop drive system according to claim 2, wherein said output signal providing means comprises:
    a digital phase detector responsive to said third and fifth pulse trains for providing an output pulse signal, the duty cycle and polarity of which varies as a function of the phase difference between said third and fifth pulse trains.

4. A closed-loop drive system according to claim 1, wherein said output signal conducting means comprises:
    charging means for accumulating a DC charge, said output pulse signal being applied to said charging means to charge or discharge same, the charge accumulated on said charging means being coupled to said voltage controlled oscillator for controlling the frequency thereof.

5. A closed-loop drive system according to claim 1, 2, 3, or 4, further comprising:
    first and second NOR gates responsive to said second pulse train, the output of said first NOR gate being conducted to said first exclusive OR gate, the output of said second NOR gate being conducted to said second OR gate; and
    means for selectively enabling said first or second NOR gate during driving or braking of said motor to selectively pass said second pulse train to said first or second exclusive OR gate.

6. A closed-loop drive system for variable speed induction motors comprising:
    means for providing a first signal having a frequency proportional to the actual rotational speed of said motor;
    means for providing a second signal having a frequency proportional to the desired slip of said motor;
    a first exclusive OR gate responsive to said first signal and selectively responsive to said second signal for providing a third signal having a frequency proportional to the sum of the frequencies of said first and second signals during driving of said motor and proportional to the frequency of said first signal only during braking of said motor;
    means for providing a fourth signal;
    means for supplying to said motor a drive signal having a frequency proportional to the frequency of said fourth signal;
    a second exclusive OR gate responsive to said fourth signal and selectively responsive to said second signal for providing a fifth signal having a frequency proportional to the sum of the frequencies of said second and fourth signals during braking of said motor and proportional to the frequency of said fourth signal only during driving of said motor;

means responsive to said fourth signal for triggering said second signal providing means to prevent said second and fourth signals from having exactly coincident transitions;

means responsive to said third and fifth signals for providing an output signal proportional to the frequency or phase difference therebetween; and means for conducting said output signal to said fourth signal providing means for controlling the frequency thereof.

7. A closed-loop drive system according to claim 6, wherein said fourth signal providing means comprises: a voltage controlled oscillator.

8. A closed-loop drive system according to claim 6 or 7 further comprising:

first and second NOR gates responsive to said second signal, the output of said first NOR gate being conducted to said first exclusive OR gate, the output of said second NOR gate being conducted to said second OR gate; and means for selectively enabling said first or second NOR gate during driving or braking of said motor to selectively pass said second signal to said first or second exclusive OR gate.

* * * * *